(12) United States Patent
Harada et al.

(10) Patent No.: US 7,294,316 B2
(45) Date of Patent: Nov. 13, 2007

(54) HONEYCOMB STRUCTURE, HONEYCOMB FILTER AND PROCESSES FOR THE PRODUCTION THEREOF

(75) Inventors: Takashi Harada, Nagoya (JP); Yukio Miyairi, Nagoya (JP); Yoshiyuki Kasai, Kasugai (JP); Shinji Kawasaki, Nagoya (JP)

(73) Assignee: NGK Insulators, Ltd, Nagoya (JP)

( * ) Notice: Subject to any disclaimer, the term of this patent is extended or adjusted under 35 U.S.C. 154(b) by 615 days.

(21) Appl. No.: 10/048,584

(22) PCT Filed: Jun. 4, 2001

(86) PCT No.: PCT/JP01/04688

§ 371 (c)(1),
(2), (4) Date: Feb. 1, 2002

(87) PCT Pub. No.: WO01/93984

PCT Pub. Date: Dec. 13, 2001

(65) Prior Publication Data
US 2003/0053940 A1    Mar. 20, 2003

(30) Foreign Application Priority Data

Jun. 5, 2000 (JP) ............................. 2000-168234
Mar. 7, 2001 (JP) ............................. 2001-064077

(51) Int. Cl.
*B01J 35/02* (2006.01)
(52) U.S. Cl. ............... 422/180; 422/177; 422/211; 422/174; 422/175; 422/179; 428/116; 428/593; 29/890
(58) Field of Classification Search ............... 422/171, 422/177, 180, 211, 222; 428/116, 593
See application file for complete search history.

(56) References Cited

U.S. PATENT DOCUMENTS

| 4,304,585 A | 12/1981 | Oda et al. ............... 428/116 |
| 4,335,783 A | 6/1982 | McBrayer et al. ........ 428/116 |
| 4,953,627 A | 9/1990 | Ito et al. ................. 428/116 |
| 5,914,187 A | 6/1999 | Naruse et al. ........... 428/116 |

(Continued)

FOREIGN PATENT DOCUMENTS

JP     2-117033     9/1990

(Continued)

*Primary Examiner*—Glenn Caldarola
*Assistant Examiner*—Kaity Handal
(74) *Attorney, Agent, or Firm*—Steptoe & Johnson LLP

(57) ABSTRACT

A honeycomb structure that is a plurality of honeycomb segments (21) bonded into one piece by a bonding material (25), the honeycomb segments (21) each having a large number of through-channels (11) separated from each other by partition walls (20), the bonding material (25) being composed of components substantially the same as components composing the unified body of honeycomb segments (21), and the honeycomb segments (21) being bonded to each other at their planes substantially parallel to the direction of channels of through-channels (11), in which honeycomb structure each bonded plane (22) of each honeycomb segment (21) has a structure possessing an unbonded area (12) containing at least an edge portion opening to a periphery of its gas inlet side end face (15) and/or a periphery of its gas outlet side end face (17). With this honeycomb structure, there is no cracking caused by the thermal stress during the use, and excellent durability can be obtained.

8 Claims, 10 Drawing Sheets

U.S. PATENT DOCUMENTS 6,939,522 B1 * 9/2005 Harada et al. .............. 422/211
6,942,712 B2 * 9/2005 Hamanaka et al. ........... 55/523

FOREIGN PATENT DOCUMENTS

| JP | 3-65306 | 3/1991 |
| JP | 3-121213 | 5/1991 |
| JP | 4-130069 | 5/1992 |
| WO | WO 97/25203 * | 7/1997 |

* cited by examiner

FIG.2(a)
FIG.2(b)
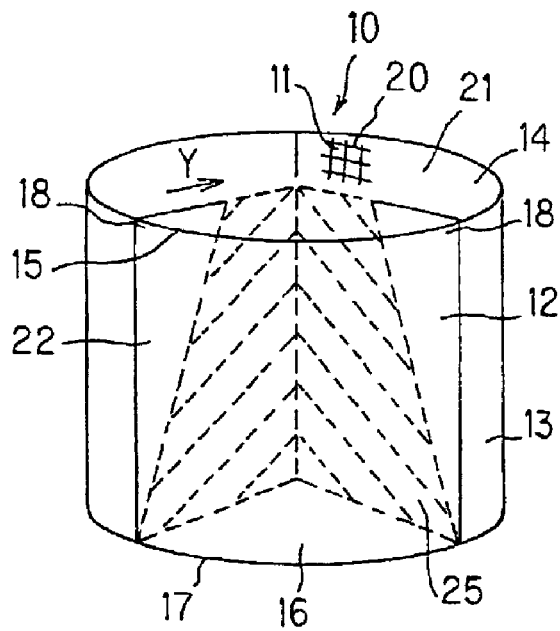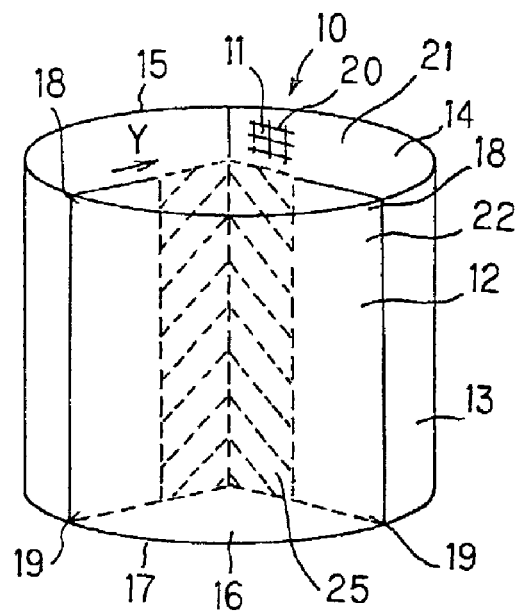
FIG.3(a)
FIG.3(b)
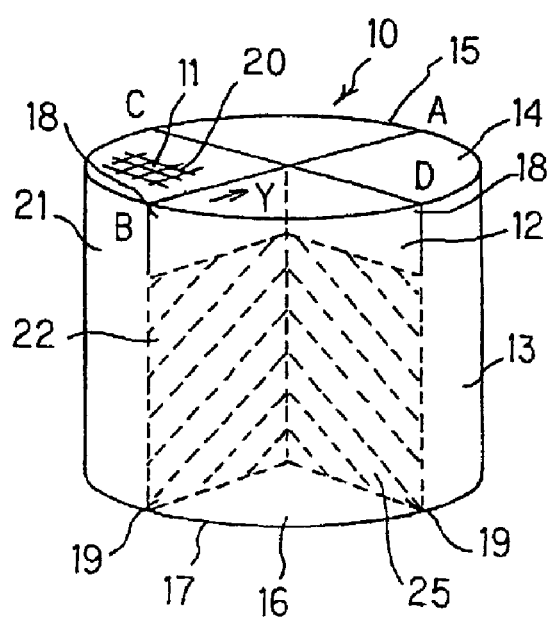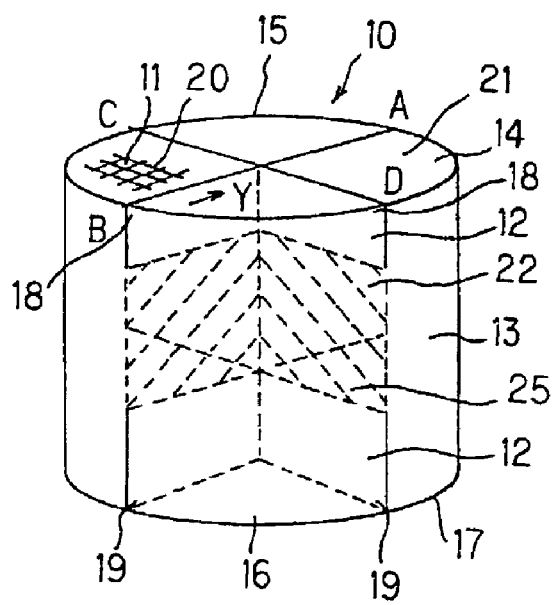

DIRECTION OF GAS FLOW

HONEYCOMB STRUCTURE, HONEYCOMB FILTER AND PROCESSES FOR THE PRODUCTION THEREOF

TECHNICAL FIELD

The present invention relates to a honeycomb structure for catalyst loading, used in an exhaust gas purifier of a heat engine (e.g. an internal combustion engine) or a burner (e.g. a boiler), a reforming unit of a liquid fuel or a gaseous fuel, and the like; a honeycomb filter; and processes for producing them.

BACKGROUND ART

Honeycomb structures having a catalyst component loaded thereon have been used in an exhaust gas purifier of a heat engine (e.g. an internal combustion engine) or a burner (e.g. a boiler), a reforming unit of a liquid fuel or a gaseous fuel, and the like. Also, it is known that honeycomb filters are used for capturing and removing the particulate matter contained in a particle-containing fluid such as exhaust gas emitted from a diesel engine.

The honeycomb structures or honeycomb filters used for such purposes have had problems; for example, they are subjected to rapid temperature change by exhaust gas or undergo local heating, an uneven temperature distribution easily appears therein, resultantly they come to have cracks. Particularly when they were used as a honeycomb filter for capturing the particulate matter contained in the exhaust gas emitted from a diesel engine, cracks appeared easily because the carbon fine particles accumulated on the filter must be burnt for removal and it inevitably causes local heating to high temperatures and easily generates a large thermal stress. In this case, the thermal stress is generated because the uneven temperature distribution allows different portions of the honeycomb structure to show different thermal expansion deformations and resultantly the individual portions are restricted by each other and are unable to make free deformation.

It is also known that in producing a large honeycomb structure so as to meet the application purpose, a plurality of honeycomb segments are bonded by a bonding material to obtain a one-piece honeycomb structure or honeycomb filter. In this case as well, the thermal stress generated in the honeycomb structure or honeycomb filter produced must be reduced.

To reduce such a thermal stress, there is disclosed, in, for example, U.S. Pat. No. 4,335,783, a process for producing a honeycomb structure, which comprises bonding a large number of honeycomb segments with a discontinuous bonding material. In this honeycomb structure, however, the thermal stress generated therein could not be reduced sufficiently because no consideration was made to the fact that the generation of thermal stress appears mainly in the vicinity of each periphery of the two end faces where the inlet and outlet of each through-channel exist. Further, since the bonding material is formed discontinuously, the bonding strength between honeycomb segments was not sufficient and the produced honeycomb structure had no sufficient mechanical strength.

In JP-B-61-51240 is proposed a thermal shock resistant rotary heat regenerator obtained by subjecting a ceramic material to extrusion molding to obtain a honeycomb matrix body of honeycomb structure, firing the honeycomb matrix body, then making smooth the outer surface of the fired honeycomb matrix segment, coating, on the smoothened outer surface, a ceramic bonding material having substantially the same mineral composition (after firing) as that of the matrix segment and showing a thermal expansion coefficient different from that of the honeycomb matrix segment by 0.1% or less at 800° C., bonding a plurality of such honeycomb matrix segments to each other into one piece, and firing the one-piece structure. In this thermal shock resistant rotary heat regenerator as well, thermal stress appears mainly in the vicinity of each periphery of the two end faces where the inlet and outlet of each through-channel exist; nevertheless, the honeycomb segments are bonded even at the peripheries of the two end faces; therefore, the thermal stress generated could not be reduced sufficiently.

In the SAE Article 860008 of 1986 is disclosed a ceramic honeycomb filter obtained by bonding a plurality of cordierite honeycomb segments with a cordierite cement. In this honeycomb filter as well, bonding is made even at each periphery of the two end faces where the inlet and outlet of each through-channel exist, similarly to the cases of the above-mentioned honeycomb structure, etc.; therefore, the thermal stress generated could not be sufficiently reduced.

In JP-A-8-28246 is disclosed a ceramic honeycomb filter obtained by bonding a plurality of honeycomb ceramic segments with an elastic sealing material formed by bonding at least a three-dimensionally intertweaved inorganic fiber and inorganic particles via an inorganic binder and an organic binder. In this honeycomb filter as well, the honeycomb segments and the sealing material are not composed of the same material and bonding is made even at each periphery of the two end faces where the inlet and outlet of each through-channel exist; therefore, the thermal stress generated at the end faces could not be reduced.

The present invention has been made in view of such problems of the prior arts. The present invention aims at providing a honeycomb structure which generates no crack caused by the thermal stress during the use and therefore has excellent durability; a honeycomb filter; and processes for producing such a honeycomb structure and such a honeycomb filter.

DISCLOSURE OF THE INVENTION

According to the present invention there is provided a honeycomb structure possessing a plurality of honeycomb segments each having a large number of through-channels separated from each other by partition walls; said honeycomb structure formed as a unified body by bonding said plurality of honeycomb segments each other at their planes substantially parallel to a direction of the through-channels with a bonding material being composed of components substantially same as components composing the honeycomb segments, characterized in that each bonded plane of each honeycomb segment includes an unbonded area inclusive of at least one edge portion opening to a periphery of its gas inlet side end face and/or a periphery of its gas outlet side end face.

According to the present invention there is also provided a honeycomb filter possessing a plurality of honeycomb filter segments each having a large number of through-channels separated from each other by partition walls, and passing through between its gas inlet side and its gas outlet side; said through-channels plugged alternately at an every other end face of its gas inlet side and its gas outlet side with a plugged material; said honeycomb filter formed as a unified body by bonding said plurality of honeycomb filter segments each other at their planes substantially parallel to a direction of the through-channels with a bonding material being composed of components substantially same as components composing the honeycomb segments, characterized in that each bonded plane of said honeycomb filter segments includes an unbonded area inclusive of at least one edge portion opening to a periphery of its gas inlet side end face or a periphery of its gas outlet side end face.

In the above honeycomb structure and honeycomb filter (hereinafter, they are referred to as "the honeycomb structure, etc." in some cases), one may compose honeycomb segments and bonding material mainly of metal Si and SiC, that the Si content [specified by Si/(Si+SiC)] of the honeycomb segments is 5 to 50% by weight, and that the Si content [specified by Si/(Si+SiC)] of the bonding material is the same as or higher than the Si content of the honeycomb segments to be bonded and is 10 to 80% by weight.

Also in the honeycomb structure, etc. of the present invention, it is preferred that the bonding material is provided continuously on each bonded plane and that the unbonded area of each bonded plane is formed from the periphery of the gas inlet side end face of honeycomb segment or the periphery of the gas outlet side end face of honeycomb segment toward the direction of the through-channels, in a length of 10% or more relative to the total length of the honeycomb structure in the same direction, or from the periphery of the gas inlet side end face of honeycomb segment or the periphery of the gas outlet side end face of honeycomb segment toward the center of the end face, in a length of 10% or more relative to the total width of the end face of the honeycomb structure.

Further in the honeycomb structure, etc. of the present invention, it is preferred that at least part of the unbonded area of each bonded plane has a filler material composed mainly of a heat-resistant inorganic material and that the filler material satisfies at least either of a requirement that its Young's modulus is 80% or less of the Young's modulus of the honeycomb segments and a requirement that its strength is smaller than the strength of the honeycomb segments.

Furthermore in the honeycomb structure, etc. of the present invention, it is preferred that the honeycomb segments are composed mainly of at least one kind of ceramic selected form the group consisting of cordierite, mullite, alumina, spinel, silicon carbide, silicon nitride, lithium aluminum silicate, aluminum titanate and combinations thereof, or of a Fe—Cr—Al type metal. One may load the partition walls of the honeycomb segments with a catalyst.

Meanwhile, according to the present invention there is provided a process for producing a honeycomb structure, characterized by kneading powders of raw materials, a binder and water, molding thus obtained kneaded material and drying a molded material to obtain a honeycomb body, forming a bonding layer composed of components substantially same as components composing the honeycomb body, on each plane of honeycomb bodies substantially parallel to a direction of through-channels, at least exclusive of an edge portion opening to a periphery of its gas inlet side end face or a periphery of its gas outlet side end face, bonding a plurality of resulting honeycomb bodies into unified honeycomb structures through said bonding layer, and firing the resulting unified honeycomb bodies.

According to the present invention there is also provided a process for producing a honeycomb structure, characterized by kneading powders of raw materials, a binder and water, molding thus obtained kneaded material and drying a molded material to obtain a honeycomb body, firing said honeycomb body to obtain honeycomb segments, forming a bonding layer composed of components substantially same as components composing the honeycomb body, on each plane of honeycomb segments substantially parallel to a direction of through-channels, at least exclusive of an edge portion opening to a periphery of its gas inlet side end face or a periphery of its gas outlet side end face, bonding a plurality of resulting honeycomb segments into a unified honeycomb structure through said bonding layer, and, firing the resulting unified honeycomb structure.

According to the present invention there is further provided a process for producing a honeycomb structure, characterized by kneading powders of raw materials, a binder and water, molding thus obtained kneaded material and drying a molded material to obtain a honeycomb body, subjecting outer surface of the honeycomb body to machining, forming a bonding layer composed of components substantially same as components composing honeycomb bodies, on each plane of honeycomb bodies substantially parallel to a direction of through-channels, at least exclusive of an edge portion opening to a periphery of its gas inlet side end face or a periphery of its gas outlet side end face, bonding a plurality of resulting honeycomb bodies into a unified honeycomb structure through said bonding layer, and firing the resulting unified honeycomb structure.

According to the present invention there is furthermore provided a process for producing a honeycomb structure, characterized by kneading powders of raw materials, a binder and water, molding thus kneaded material and drying a molded material to obtain a honeycomb body, forming a bonding layer composed of components substantially same as components composing the honeycomb body, on each plane of honeycomb bodies substantially parallel to a direction of through-channels, at least exclusive of an edge portion opening to a periphery of its gas inlet side end face or a periphery of its gas outlet side end face, bonding a plurality of resulting honeycomb segments into a unified honeycomb structure through said bonding layer, subjecting outer surface of the resulting unified honeycomb structure to machining, and firing the resulting machining honeycomb structure.

According to the present invention there is furthermore provided a process for producing a honeycomb structure, characterized by kneading powders of raw materials, a binder and water, molding thus kneaded material and drying a molded material to obtain a honeycomb body, subjecting outer surface of the honeycomb body to machining, firing the machining honeycomb body to obtain a honeycomb segment, forming a bonding layer composed of components substantially same as components composing the honeycomb body, on each plane of the honeycomb segment substantially parallel to a direction of through-channels, at least exclusive of an edge portion opening to a periphery of its gas inlet side end face or a periphery of its gas outlet side end face, bonding a plurality of resulting honeycomb segments into a unified honeycomb structure through said bonding layer, and firing resulting unified honeycomb structure.

According to the present invention there is furthermore provided a process for producing a honeycomb structure, characterized by kneading powders of raw materials, a binder and water, molding thus kneaded material and drying a molded material to obtain a honeycomb body, firing the honeycomb body to obtain a honeycomb segment, subjecting the outer surface of the honeycomb segment to machining, forming a bonding layer composed of components substantially same as components composing the honeycomb body, on each plane of the honeycomb segment substantially parallel to a direction of the through-channels, at least exclusive of an edge portion opening to a periphery of its gas inlet side end face or a periphery of its gas outlet side end face, bonding a plurality of resulting honeycomb segments into a unified honeycomb structure through said bonding layer, and firing the resulting unified honeycomb structure.

Meanwhile, according to the present invention there is provided a process for producing a honeycomb filter, characterized by kneading a raw materials mixed powder, a binder and water, molding thus kneaded material and drying thus molded material to obtain a honeycomb body, plugged through-channels alternately at an every other end face of its gas inlet side and its gas outlet side with a sealant to obtain a plugged honeycomb filter segment, forming a bonding layer composed of components substantially same as components composing honeycomb body, on each plane of the plugged honeycomb segments substantially parallel to a direction of through-channels, at least exclusive of an edge portion opening to a periphery of its gas inlet side end face or a periphery of its gas outlet side end face, bonding a plurality of plugged honeycomb segments each other at their planes substantially parallel to a direction of through-channels into a unified honeycomb structure through the bonding layer, and firing the resulting unified honeycomb structure.

According to the present invention there is also provided a process for producing a honeycomb filter, characterized by kneading a raw materials mixed powder, a binder and water, molding thus kneaded material and drying thus molded material to obtain a honeycomb body, firing the resulting honeycomb body to obtain a honeycomb segment, plugging through-channels alternately at an every other end face of its gas inlet side and its gas outlet side with a sealant to obtain a plugged honeycomb body, forming a bonding layer composed of components substantially same as components composing honeycomb body, on each plane of the plugged honeycomb bodies substantially parallel to a direction of through-channels, at least exclusive of an edge portion opening to a periphery of its gas inlet side end face or a periphery of its gas outlet side end face, bonding a plurality of plugged honeycomb bodies each other at their planes substantially parallel to a direction of through-channels into a unified honeycomb structure through the bonding layer, and firing the resulting unified honeycomb structure.

According to the present invention there is also provided a process for producing a honeycomb filter, characterized by kneading a raw materials mixed powder, a binder and water, molding thus kneaded material and drying thus molded, material to obtain a honeycomb body, plugging through-channels alternately at an every other end face of its gas inlet side and its gas outlet side with a plugged material to obtain a plugged honeycomb filter segment, forming a bonding layer composed of components substantially same as components composing honeycomb body, on each plane of the plugged honeycomb bodies substantially parallel to a direction of through-channels, at least exclusive of an edge portion opening to a periphery of its gas inlet side end face or a periphery of its gas outlet side end face, bonding a plurality of plugged honeycomb segments each other at their planes substantially parallel to a direction of through-channels into a unified honeycomb structure through the bonding layer, subjecting outer surface of the resulting unified honeycomb filter to machining, and firing the resulting unified honeycomb structure.

According to the present invention, there is further provided a process for producing a honeycomb filter, characterized by kneading a raw materials mixed powder, a binder and water, molding thus kneaded material and drying thus molded, material to obtain a honeycomb body, subjecting outer surface of the resulting honeycomb body to machining, firing the resulting honeycomb body, plugging through-channels alternately at an every other end face of its gas inlet side and its gas outlet side with a plugged material to obtain a plugged honeycomb filter body, forming a bonding layer composed of components substantially same as components composing honeycomb body, on each plane of the plugged honeycomb bodies substantially parallel to a direction of through-channels, at least exclusive of an edge portion opening to a periphery of its gas inlet side end face or a periphery of its gas outlet side end face, bonding a plurality of plugged honeycomb segments each other at their planes substantially parallel to a direction of through-channels into a unified honeycomb structure through the bonding layer, and firing the resulting unified honeycomb structure.

According to the present invention, there is moreover provided a process for producing a honeycomb filter, characterized by kneading a raw materials mixed powder, a binder and water, molding thus kneaded material and drying thus molded material to obtain a honeycomb body, firing the resulting honeycomb body to obtain a honeycomb segment, subjecting outer surface of the resulting honeycomb body to machining, plugging through-channels alternately at an every other end face of its gas inlet side and its gas outlet side with a plugged material to obtain a plugged honeycomb filter segment, forming a bonding layer composed of components substantially same as components composing honeycomb body, on each plane of the plugged honeycomb segments substantially parallel to a direction of through-channels, at least exclusive of an edge portion opening to a periphery of its gas inlet side end face or a periphery of its gas outlet side end face, bonding a plurality of plugged honeycomb filter segments each other at their planes substantially parallel to a direction of through-channels into a unified honeycomb filter through the bonding layer, and firing the resulting unified honeycomb filter.

In these processes for producing the honeycomb structure, etc., it is preferred that the bonding layer is formed continuously. The outer surfaces of the honeycomb structure, etc. obtained may be subjected to machining.

It is also preferred that a filler composed mainly of a heat-resistant inorganic material is coated on at least part of the sides of the honeycomb filter, etc. The honeycomb structure, etc. after production may have a catalyst loaded thereon.

It is also preferred that a filler composed mainly of a heat-resistant inorganic material is disposed on at least part of the unbonded portion of each bonding layer-formed plane.

The honeycomb segments and the bonding layer are preferably composed mainly of at least one kind of ceramic selected form the group consisting of cordierite, mullite, alumina, spinel, silicon carbide, silicon nitride, lithium aluminum silicate, aluminum titanate and combinations thereof, or of a Fe—Cr—Al type metal, or of metal Si and SiC.

BRIEF DESCRIPTION OF THE DRAWINGS

FIG. 2(*a*) and FIG. 2(*b*) are each a perspective view showing other embodiment of the honeycomb structure according to the present invention.

FIG. 3(a) and FIG. 3(b) are each a perspective view showing other embodiment of the honeycomb structure according to the present invention.

BEST MODE FOR CARRYING OUT THE INVENTION

Figure 1A:
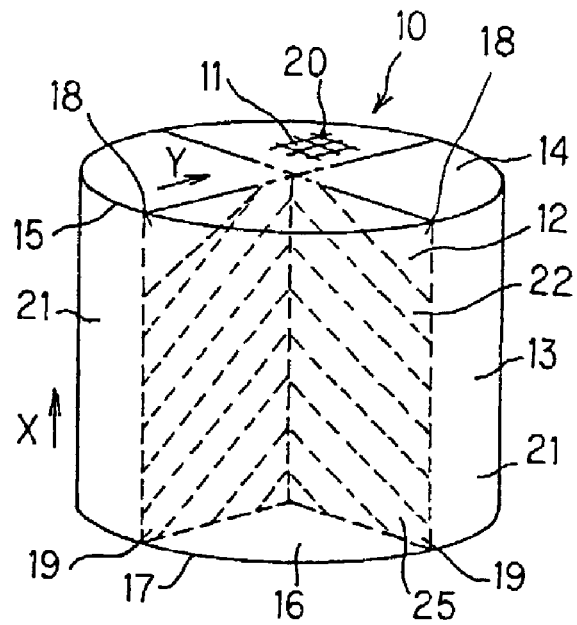
FIG. 1(*a*), FIG. 1(*b*), FIG. 1(*c*) and FIG. 1(*d*) are each a perspective view showing an embodiment of the honeycomb structure according to the present invention.

In the honeycomb structure, etc. of the present invention, a plurality of honeycomb segments or honeycomb filters (they are hereinafter referred to as "honeycomb segments, etc." in some cases) are bonded into one piece by a bonding material composed of components substantially same as the components composing the honeycomb bodies. As a consequence, the honeycomb segments and the bonding material show about the same thermal expansion coefficients during the use of filter, whereby the generation of thermal stress can be reduced.

According to the intensive study made by the present inventors, it has been found that a very large thermal stress appears in the periphery of the gas inlet side or gas outlet side end face of the honeycomb segments, etc. In the present invention, therefore, each bonded plane of the honeycomb segments, etc. is constituted so as to have an unbonded area which includes at least an end portion opening to the above periphery. Accordingly, the thermal stress generated in the honeycomb structure, etc. can be reduced further in addition to the above-mentioned reduction obtained by the use of the bonding material; thereby, the honeycomb structure, etc. of the present invention can be free from cracks or the like and can have excellent durability.

Hereinafter, in-depth description is made on the constituent features of the honeycomb structure, etc. according to the present invention.

The honeycomb structure according to the present invention is obtained by unifying a plurality of honeycomb segments each having a large number of through-channels separated from each other by partition walls. The honeycomb filter according to the present invention is obtained by unifying a plurality of honeycomb filter segments each having a large number of through-channels extending from the gas inlet side end face to the gas outlet side end face, separated from each other by partition walls; said through-channels plugged alternately at an every other end face of its gas inlet side and its gas outlet side with a plugged material.

In the honeycomb segments, etc. according to the present invention, the sectional shape (cell shape) of each through-channel is preferably any of triangle, tetragon, hexagon and corrugation in view of the production efficiency.

The cell density of each cell formed by partition walls is preferably 6 to 2,000 cells/in.$^2$ (0.9 to 311 cells/cm$^2$), more preferably 50 to 400 cells/in.$^2$ (7.8 to 62 cells/cm$^2$) in view of the strength and effective GSA (geometrical surface area) of honeycomb segment and the pressure loss during gas flow.

As the shape of each honeycomb segment, there can be mentioned, for example, a shape which is obtained by dividing a cylinder into three or four portions by a plane including the central axis and which is fan-like in a section perpendicular to the axial direction; and shapes which are obtained by dividing a cylinder into nine or more portions at given intervals by a plane of axial direction and which are fan-like, tetragonal, etc. (different depending upon the portions) in a section perpendicular to the axial direction. Of these, a shape obtained by dividing a honeycomb segment into nine or more portions is preferred because with this shape, a large number of bonded planes can be formed three-dimensionally and the thermal stress of honeycomb filter can be reduced.

Meanwhile, in the present invention, the honeycomb segments are preferably composed of at least one kind of ceramics selected form the group consisting of cordierite, mullite, alumina, spinel, silicon carbide, silicon nitride, lithium aluminum silicate, aluminum titanate and combinations thereof, or of a Fe—Cr—Al type metal, in view of the strength, heat resistance, etc. Of these, silicon carbide is preferred because it has a high thermal conductivity and can release heat easily.

In the present invention, it is also preferred that the honeycomb segments are composed mainly of metal Si and SiC. In this case, the Si content in honeycomb segment, specified by Si/(Si+SiC) is preferably 5 to 50% by weight, more preferably 10 to 40% by weight. When the Si content is less than 5% by weight, bonding by Si is insufficient, which may result in insufficient thermal conductivity and strength. Meanwhile, when the Si content is more than 50% by weight, excessive shrinkage appears, which may incur problems such as low porosity, small pore diameter and the like.

In the present invention, there is no particular restriction as to the plugged material used for plugging through-channels. There can be mentioned, for example, a plugged material composed of the same ceramic and/or metal as used in the honeycomb segments.

In the present invention, each honeycomb segment can be obtained by charging a binder and water into a raw material powder composed of the above-mentioned ceramic and/or metal, kneading the resulting mixture, molding the kneaded material into a desired shape, drying the molded material to obtain a honeycomb body, and lastly firing the honeycomb body.

In the present invention, each honeycomb body is preferably subjected to machining of the outer surface for improved dimensional accuracy, prior to the bonding by a bonding material. This machining of outer surface may be carried out to each honeycomb body obtained by molding.

As the binder used in the present invention, there can be mentioned, for example, hydroxymethyl cellulose, methyl cellulose, hydroxyethyl cellulose, carboxymethyl cellulose and a polyvinyl alcohol. These binders can be used singly or in combination of two or more kinds.

In the present invention, one may add, as necessary, a molding aid used generally such as ethylene glycol, dextrin, fatty acid soap, polyalcohol or the like.

The amount of water to be charged is ordinarily about 10 to 40 parts by weight per 100 parts by weight of the above-mentioned powder material. After charging water, the resulting raw material mixture is kneaded using a vacuum kneader or the like to obtain a plastic kneaded material.

Molding is carried out preferably by extrusion. It can be carried out by using, for example, a ram type extruder or a twin-screw type continuous extruder.

As the method for drying, there can be mentioned, for example, hot-air drying, microwave drying, dielectric drying, reduced pressure drying, vacuum drying and freeze-drying. Of them, dielectric drying, microwave drying and hot-air drying are preferably conducted singly or in combination. The firing conditions can be selected appropriately depending upon the material used.

In the honeycomb filter of the present invention, plugging through-channels can be carried out in the honeycomb body after molding and drying, or by plugging through-channels in the honeycomb segment after firing. Of these, it is preferable to plug through-channels of the honeycomb body because the plugged material can show a large bonding strength.

In the honeycomb segments, etc. of the present invention, two planes each substantially parallel to the direction of the channels of the through-channels are bonded to each other by a bonding material composed mainly of components substantially same as the components composing each honeycomb segment, and each bonded plane includes an unbonded area inclusive of at least one edge portion opening to a periphery of its gas inlet side end face or a periphery of its gas outlet side end face.

In the present specification, bonded plane means a plane on part of which a bonding material is disposed. Unbonded area means part of the bonded plane where no bonding material is disposed. Substantially parallel plane includes even a plane which is not parallel, in a strict sense, as far as such a plane does not hinder bonding of honeycomb segments to each other.

In the present invention, the bonding material may be either a bonded plane being discontinuously disposed at two or more locations or a bonded plane being continuously disposed. Its continuous formation on bonded plane is preferred because the resulting honeycomb segments, etc. can show a high bonding strength.

As the shape of the bonding material, there can be mentioned, for example, triangle, rectangle, square, rhombus, trapezoid, ellipse, circle, track circle, half ellipse and half circle. Ellipse, circle, track circle, etc. are preferred because they can easily make uniform the temperature of the whole filter.

The unbonded area of each bonded plane is preferably formed from the periphery of the gas inlet side end face of the honeycomb structure, etc. or the periphery of the gas outlet side end face of the honeycomb structure, etc. toward the direction of the through-channels, in a length of 10% or more, preferably 30% or more relative to the total length of the honeycomb structure, etc. in the same direction. When the length of the unbonded area is in this range, the thermal stress of the whole honeycomb structure, etc. can be reduced effectively, the generation of cracks, etc. can be prevented, and improved durability can be attained.

Also, the unbonded area of each bonded plane is preferably formed from the periphery of the gas inlet side end face or the periphery of the gas outlet side end face toward the center of the end face, in a length of 10% or more, preferably 30% or more relative to the total width of the end face of the honeycomb structure, etc. Thereby, larger reduction of thermal stress is possible and further improvement of durability is attained.

In the present invention, it is preferred that each bonded area is formed in about the center of the honeycomb structure, etc. and that each unbonded area is formed so as to contain all of the lengths of each bonded plane contacting with the side, gas outlet side end face and gas inlet side end face of the honeycomb structure, etc. Thereby, the portions of the honeycomb structure, etc. where thermal stress appears easily, can deform easily and the generation of cracks, etc. can be reduced to a very low level.

In the present invention, it is further preferred that the unbonded areas are formed symmetrically to the central axis of the honeycomb structure, etc. to minimize the nonuniform deformation of the honeycomb structure, etc. However, as shown in, for example, FIGS. 11(a) to 11(d), unbonded areas 12 may be formed asymmetrically to the central axis of the honeycomb structure, etc.

Meanwhile, in the present invention, the bonding material is composed of components substantially same as the components composing the honeycomb segments, as mentioned previously.

Specifically, the bonding material can be composed of, for example, at least one kind of ceramics selected form the group consisting of cordierite, mullite, alumina, spinel, silicon carbide, silicon nitride, lithium aluminum silicate, aluminum titanate and combinations thereof, or a Fe—Cr—Al type metal so that these components correspond to the components of the honeycomb segments mentioned previously.

Meanwhile, when the honeycomb segments are composed mainly of metal Si and SIC, the bonding material also is preferably composed mainly of metal Si and SiC. In this case, however, it is preferred that the Si content of the bonding material specified by Si/(Si+SiC) is the same as or higher than the Si content of the honeycomb segments (which are bonded to each other by the bonding material) and is 10 to 80% by weight. When the Si content of the bonding material is less than the Si content of the honeycomb segments, it may be impossible to obtain a sufficient bonding strength. When the Si content is more than 80% by weight, oxidation resistance at high temperatures may be insufficient.

In the present invention, the bonding material can be formed on a honeycomb body by forming a bonding layer composed of components substantially same as the components composing the honeycomb body, on each plane of the honeycomb body substantially parallel to the direction of the through-channels, exclusive of at least one edge portion opening to a periphery of its gas inlet side end face or a periphery of its gas outlet side end face.

In the honeycomb structure of the present invention, the bonding material may be formed on a honeycomb segment by firing a honeycomb segment on which a bonding layer has been formed; said honeycomb segment having been formed by firing a honeycomb body after molding and drying. In the honeycomb filter of the present invention as well, the bonding material may be formed on a honeycomb filter segment by firing a honeycomb segment having a bonding layer formed thereon and plugged through-channels.

As a method for the formation of the bonding layer, the layer may be directly coated, on the given planes of a honeycomb segment, a slurry composed of components substantially same as the components composing the honeycomb body; however, in order to secure a predetermined thickness, the layer is preferably bonded by coating a plate of given thickness and of the same components as mentioned above with a slurry of the same components. Preferably, the bonding layer is formed continuously in order to allow each honeycomb segment, etc. to attain a higher bonding strength.

The honeycomb structure, etc. of the present invention can be obtained by unifying a plurality of bonding layer-formed honeycomb bodies, etc. into one piece and then firing the resulting unified material. The firing conditions can be those suitable for completion of bonding and the heat treatment temperature can be selected appropriately depending upon the kind of the bonding material used. However, the temperature is preferred to be ordinarily 200 to 400° C.

In the present invention, it is preferred that a filler member composed mainly of a heat-resistant inorganic material is provided at least at part of the unbonded area.

Thereby, blowing off of a fluid such as a gas through the unbonded area can be prevented.

When a filler is provided in the honeycomb filter of the present invention, it is preferred that the filler is provided at part of the unbonded area so that at least the portion of the gap formed by the unbonded area, exposed to the gas inlet end face of the honeycomb filter is blocked completely. Thereby, the accumulation of soot on the unbonded area can be prevented and, further, the thermal stress generating in the honeycomb filter can be reduced to a very low level by the gap present between the filler and the bonding material, and by the gap exposed to the gas outlet side end face 14.

As the filler composed mainly of a heat-resistant inorganic material, there can preferably be used a ceramic fiber, a ceramic powder, a cement, etc. all having heat resistance, singly or in admixture. Further, an organic binder, an inorganic binder or the like may be mixed into the filler as necessary.

The filler used in the present invention satisfies preferably at least either one of the requirements that its Young's modulus is 80% or less of the Young's modulus of the honeycomb segments and that its strength is smaller than the material strength of the honeycomb segments, more preferably both of the above two requirements.

When at least either of the above two requirements is satisfied, the thermal stress generated can be reduced greatly and the durability of honeycomb structure, etc. can be improved further. The above Young's modulus is measured and calculated from the relationship between load and displacement according to a test method for isothermal elastic modulus, and the above material strength is measured using a material tester according to a test method for four-point bending strength (JIS 1601)

In the present invention, it is also preferred that the above-mentioned filler is coated on at least part of the side of the produced honeycomb structure, etc. for improved heat resistance.

Incidentally, provision of the filler may be carried out by unifying a plurality of honeycomb segments, etc. or a plurality of honeycomb bodies, etc. into one piece, firing the unified article, disposing thereto a filler, followed by drying and as necessary firing; or by disposing a filler to honeycomb segments, etc. or honeycomb bodies, etc., prior to unifying them into one piece and firing it together with the resulting honeycomb segments, etc. or honeycomb bodies, etc.

In the present invention, the honeycomb segments, etc. unified into one piece (the honeycomb structure, etc.) may be subjected to machining at the outer surface, or the honeycomb segments, etc. unified into one piece and fired (the honeycomb structure, etc.) may be subjected to machining at the outer surface, in view of, for example, the dimensional fitting with container, etc.

In the present invention, the unified honeycomb structure, etc. can take various shapes such as circle, ellipse, race track shape and the like in the section perpendicular to the direction of the through-channels.

In the present invention, when the honeycomb structure, etc. are used as a catalyst carrier for purification of the exhaust gas emitted from a heat engine such as an internal combustion engine or a burner such as a boiler or for reformation of a liquid fuel or a gaseous fuel, it is preferred that the honeycomb segments, etc. constituting the honeycomb structure, etc. load thereon at least one kind of metal having catalysis, such as Pt, Pd, Rh or the like.

When the honeycomb structure is used as a honeycomb filter, since the honeycomb filter causes plugging by particulate material and comes to have a reduced filter capacity as captured particulate materials accumulate on the partition walls, the honeycomb filter is periodically heated by a heating means such as heater or the like to burn and remove the particulate materials, whereby the filter is regenerated. Therefore, in the honeycomb filter, the above-mentioned metal having catalysis may be loaded on the partition walls in order to promote the burning of particulate materials conducted for filter regeneration.

Hereinafter, the present invention is described in more depth referring to the embodiments shown in the drawings. However, the present invention is not restricted to these embodiments.

FIGS. 1(*a*), 1(*b*), 1(*c*) and 1(*d*) are each a perspective view showing an embodiment of the honeycomb structure according to the present invention.

The honeycomb structures 10 shown in FIGS. 1(*a*), 1(*b*), 1(*c*) and 1(*d*) are constituted by bonding four honeycomb segments 21 each having a large number of through-channels 11 extending in the axial direction (the gas flow direction) [an X direction in FIGS. 1(*a*), 1(*b*), 1(*c*) and 1(*d*)] and separated from each other by partition walls 20. The honeycomb segments 21 are bonded to each other at their planes (bonded planes) 22 substantially parallel to the direction X of the through-channels 11 by a bonding material 25 composed of components substantially the same as the components composing the honeycomb segments 21. Each bonded plane 22 has an unbonded area inclusive of an end portion 18 opening to the periphery 15 of the gas outlet side end face. (An edge portion opening to a periphery of the gas inlet side and face is represented by 19.) The bonding material 25 is provided continuously.

In the honeycomb structure 10 shown in FIG. 1(*a*), each unbonded area 12 is formed in a triangular shape so that the unbonded area 12 includes each part of the lengths of each bonded plane 22 opening to the gas outlet side end face 14 and side 13 of the honeycomb structure 10 and that the width of the unbonded area 12 in a direction Y from the side 13 of the honeycomb structure 10 toward its center becomes gradually smaller toward the gas inlet side end face 16 of the honeycomb structure 10. In the honeycomb structure 10 shown in FIG. 1(b), each unbonded area 12 is formed in a rectangular shape so that the unbonded area 12 includes each part of the lengths of each bonded plane 22 opening to the gas outlet side end face 14 and side 13 of the honeycomb structure and that the width of the unbonded area 12 in a direction Y from the side 13 of the honeycomb structure 10 toward its center is constant toward the gas inlet side end face 16. In the honeycomb structure 10 shown in FIG. 1(c), each unbonded area 12 is formed in a triangular shape so that the unbonded area 12 includes the total length of each bonded plane 22 opening to the side 13 of the honeycomb structure 10 and part of the length of each bonded plane 22 contacting with the gas outlet side end face 14 of the honeycomb structure 10 and that the width of the unbonded area 12 in a direction Y from the side 13 of the honeycomb structure 10 toward its center becomes gradually smaller toward the gas inlet side end face 16 of the honeycomb structure 10. In the honeycomb structure 10 shown in FIG. 1(d), each unbonded area 12 is formed so that the unbonded area 12 includes the total length of the bonded plane 22 opening to the side 13 of the honeycomb structure 10 and each part of the lengths of each bonded plane 22 contacting with the gas outlet side end face 14 and gas inlet side end face 16 of the honeycomb structure 10 and that the width of the unbonded area 12 in a direction Y from the side 13 of the honeycomb structure 10 toward its center is equal thereto toward the gas outlet side end face.

In the honeycomb structures 10 shown in FIGS. 1(a), 1(b), 1(c) and 1(d), even when non-uniform temperature distribution (e.g. high or low temperatures in particular locations) arises, the individual portions of the honeycomb structure 10 can make free deformation without being restricted by each other, the thermal stress is reduced, and generation of cracks can be minimized.

Figure 1C:
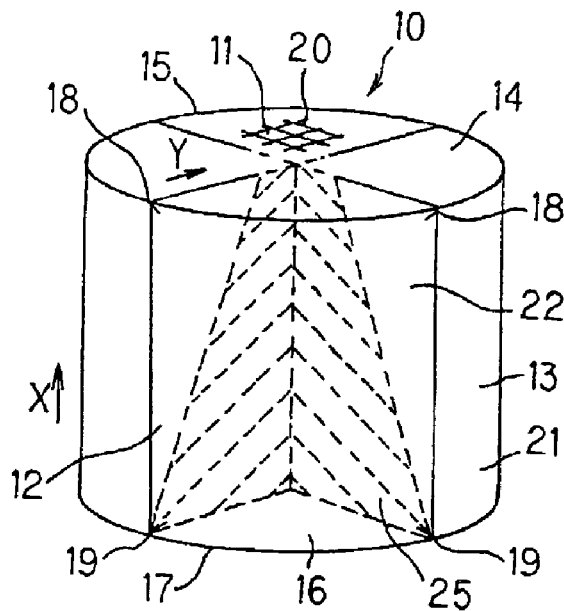
Figure 1B:
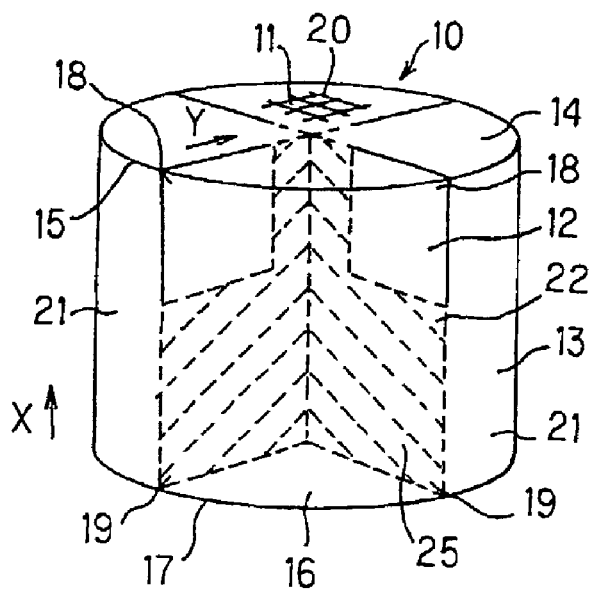
Figure 1D:
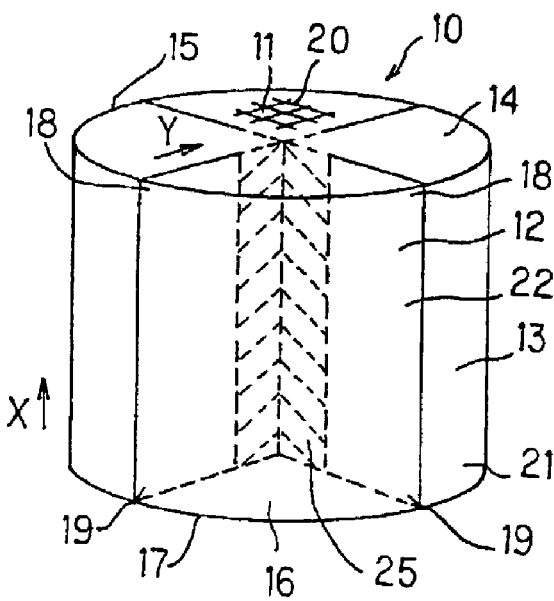

Particularly in the honeycomb structures 10 shown in FIGS. 1(c) and 1(d), thermal stress is greatly reduced in the whole portion of honeycomb structure 10; therefore, these honeycomb structures are effective particularly in the application where temperature non-uniformity takes place in the whole portion of honeycomb structure 10.

The honeycomb structures 10 shown in FIGS. 2(a) and 2(b) are constituted by bonding three honeycomb segments 21. In the honeycomb structure 10 shown in FIG. 2(a), as in FIG. 1(c), each unbonded area 12 is formed in a triangular shape so that the unbonded area 12 contains the total length of each bonded plane 22 contacting with the side 13 of the honeycomb structure 10 and part of the length of each bonded plane 22 opening to the gas outlet side end face 14 of the honeycomb structure 10 and that the width of the unbonded area 12 in a direction Y from the side 13 of the honeycomb structure 10 toward its center becomes gradually smaller toward the gas inlet side end face 16 of the honeycomb structure 10. In the honeycomb structure 10 shown in FIG. 2(b), as in FIG. 1(d), each unbonded area 12 is formed so that the unbonded area 12 includes the total length of the bonded plane 22 opening to the side 13 of the honeycomb structure 10 and each part of the lengths of each bonded plane 22 opening to the gas outlet side end face 14 and gas inlet side end face 16 of the honeycomb structure 10 and that the width of the unbonded area 12 in a direction Y from the side 13 of the honeycomb structure 10 toward its center is equal thererto toward the gas inlet side end face 16.

In such honeycomb structures as well, reduction of thermal stress of about the same level as in the honeycomb structures 10 shown in FIGS. 1(a), 1(b), 1(c) and 1(d), can be obtained.

FIGS. 3(a) and 3(b) are each a perspective view showing other embodiment of the honeycomb structure according to the present invention.

In the honeycomb structure 10 shown in FIG. 3(a), each unbonded area 12 is formed so as to include part of the length of each bonded plane 22 contacting with the side 13 of the honeycomb structure 10 and the total length of the bonded plane 22 contacting with the gas outlet side end face 14 of the honeycomb structure 10. Further, in this structure, the unbonded areas 12 are formed so as to continuously connect the two points (A and B) and also the two points (C and D) of the periphery 15 of the gas outlet side end face and cross with each other at the center of the gas outlet side end face 14.

In such a honeycomb structure 10, reduction in thermal stress is large at the gas outlet side end face 14 of the honeycomb structure 10.

In the honeycomb structure 10 shown in FIG. 3(b), each unbonded area 12 is formed so as to further include part of the length of the bonded plane 22 opening to the side 13 of the honeycomb structure 10 and the total length of the bonded plane 22 opening to the gas inlet side end face 16 of the honeycomb structure 10. Further, in this structure, the unbonded areas 12 are formed, as in the gas outlet side end face 14, so as to continuously connect the two points [not shown in FIG. 3(b)] of the periphery 17 of the gas inlet side end face and cross with each other at the center of the gas inlet side end face 16.

In such a honeycomb structure 10, reduction in thermal stress is large at the gas outlet end face 14 and the gas inlet side end face 16 and the generation of cracks can be prevented further.

Figure 4A:
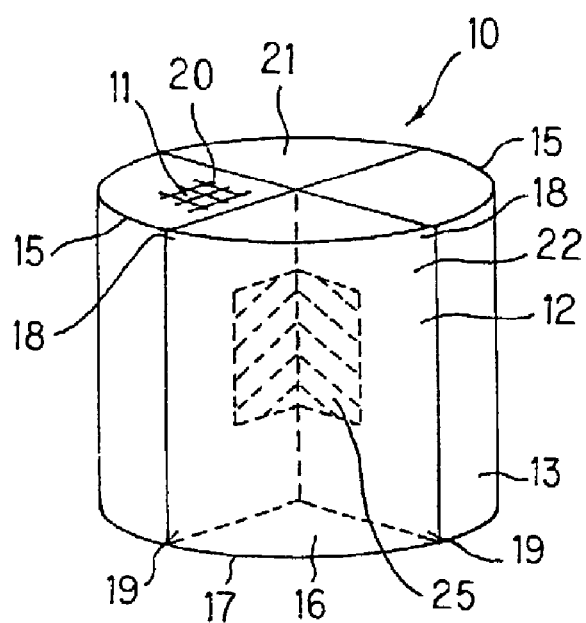
FIG. 4(a), FIG. 4(b), FIG. 4(c) and FIG. 4(d) are each a perspective view showing still other embodiment of the honeycomb structure according to the present invention.
Figure 4B:
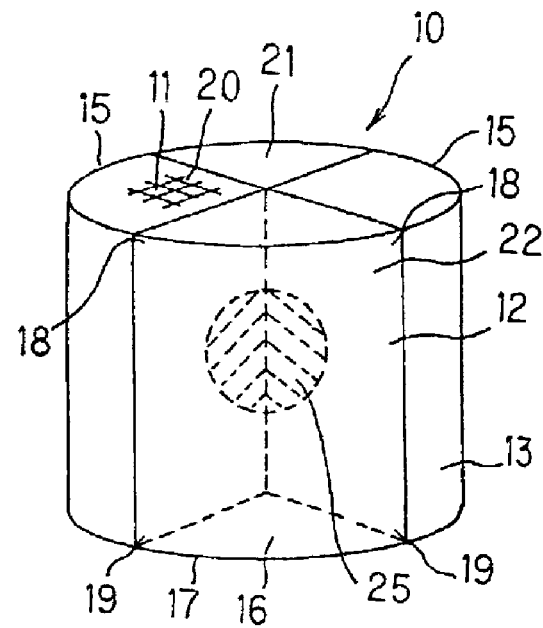
Figure 4C:
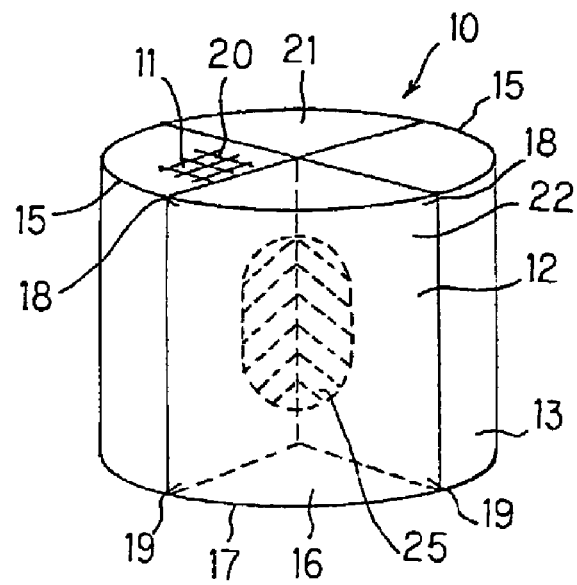
Figure 4D:
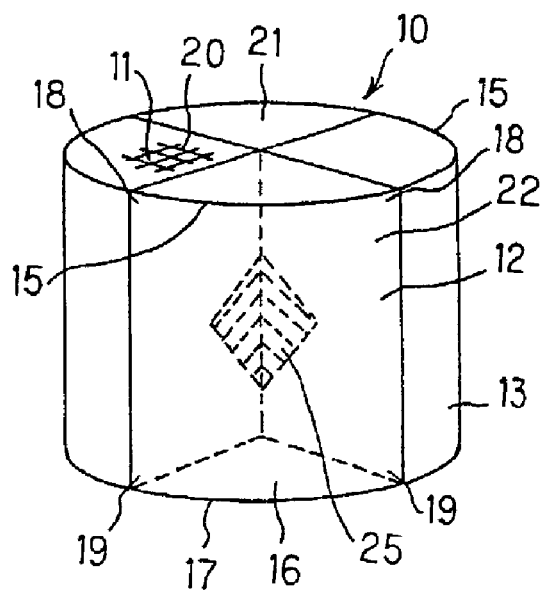
Figure 5A:
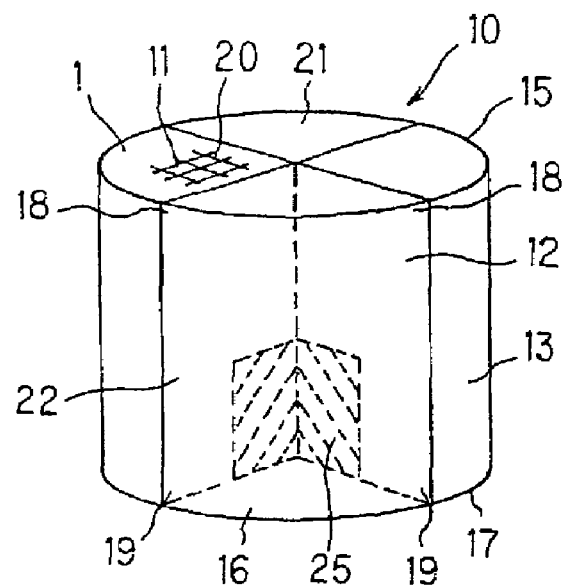
FIG. 5(a), FIG. 5(b), FIG. 5(c) and FIG. 5(d) are each a perspective view showing still other embodiment of the honeycomb structure according to the present invention.
Figure 5B:
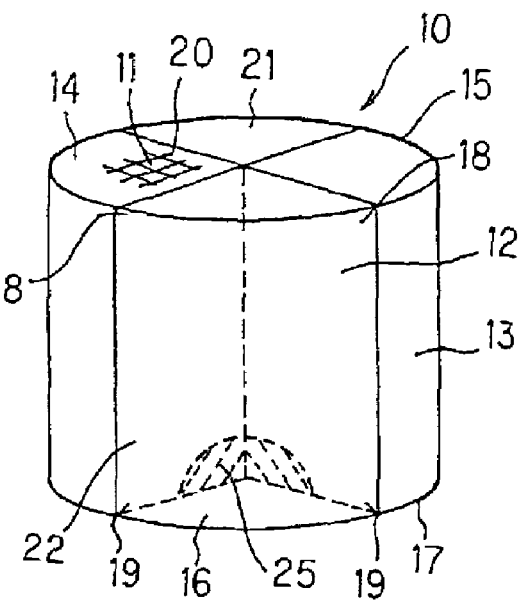
Figure 5C:
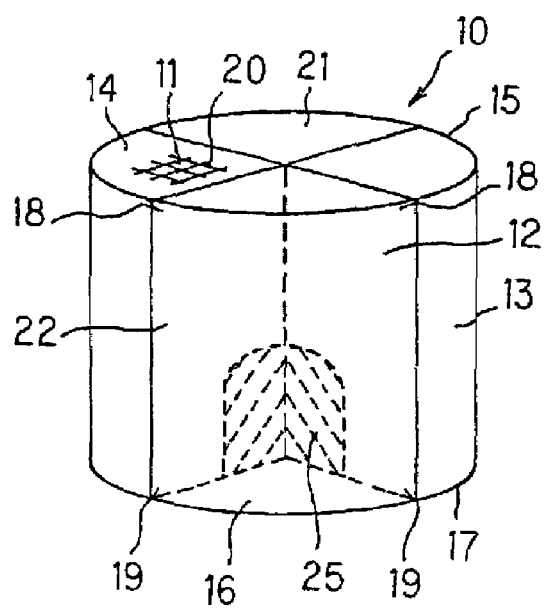
Figure 5D:
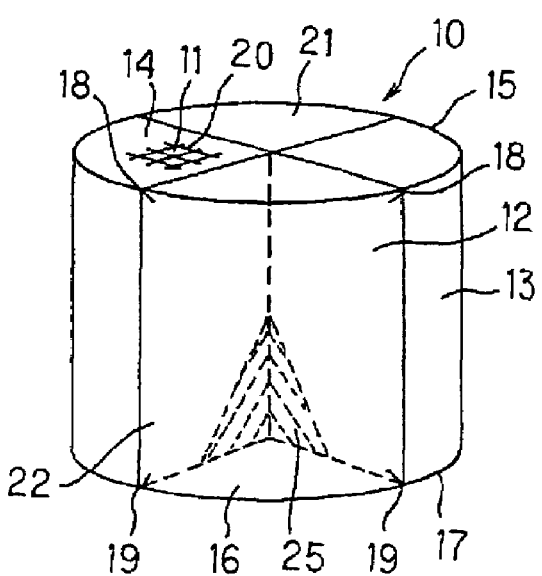

In the honeycomb structures 10 shown in FIGS. 4(a), 4(b), 4(c) and 4(c), a bonding material 25 is formed at the center of each honeycomb structure 10; and each unbonded area 12 is formed so as to include all of the lengths of each bonded plane 22 opening to the side 13, gas outlet side end face 14 and gas inlet side end face 16 of the honeycomb structure 10. FIG. 4(a) is a case wherein the bonding material 25 has a rectangular section; FIG. 4(b) is a case wherein the bonding material 25 has a circular section; FIG. 4(c) is a case wherein the bonding material 25 has a race truck-shaped section; and FIG. 4(d) is a case wherein the bonding material 25 has a rhombic section.

In these honeycomb structures 10, reduction in thermal stress is extremely large, and cracks, etc. do not appear even when temperature non-uniformity (e.g. high or low temperatures in particular locations) is large and such non-uniformity is present in the whole honeycomb structure.

Meanwhile, in the honeycomb structures 10 shown in FIGS. 5(a), 5(b), 5(c) and 5(d), each unbonded area 12 is formed so that the unbonded area 12 includes all of the lengths of each bonded plane 22 opening to the side 13 and gas outlet side end face 14 of the honeycomb structure 10 and part of the length of the bonded plane 22 opening to the gas inlet side end face 16 of the honeycomb structure 10 and that part of a bonding material 25 is exposed to the gas inlet side end face 16 of the honeycomb structure 10.

In these honeycomb structures, the thermal stresses appearing particularly in the gas outlet side end face 14 and the side 13 are reduced greatly.

In the honeycomb structures 10 shown in FIGS. 6(a) and 6(b) and FIGS. 7(c) and 7(d), as in the honeycomb structures shown In FIGS. 4(a), 4(b), 4(c) and 4(c), each unbonded area 12 is formed so as to include all of the lengths of each bonded plane 22 opening to the side 13, gas outlet side end face 14 and gas inlet side end face 16 of each honeycomb structure 10. Further, these honeycomb structures are each constituted by bonding nine honeycomb segments 14 and therefore each have a large number of bonded planes 22.

Figure 6A:
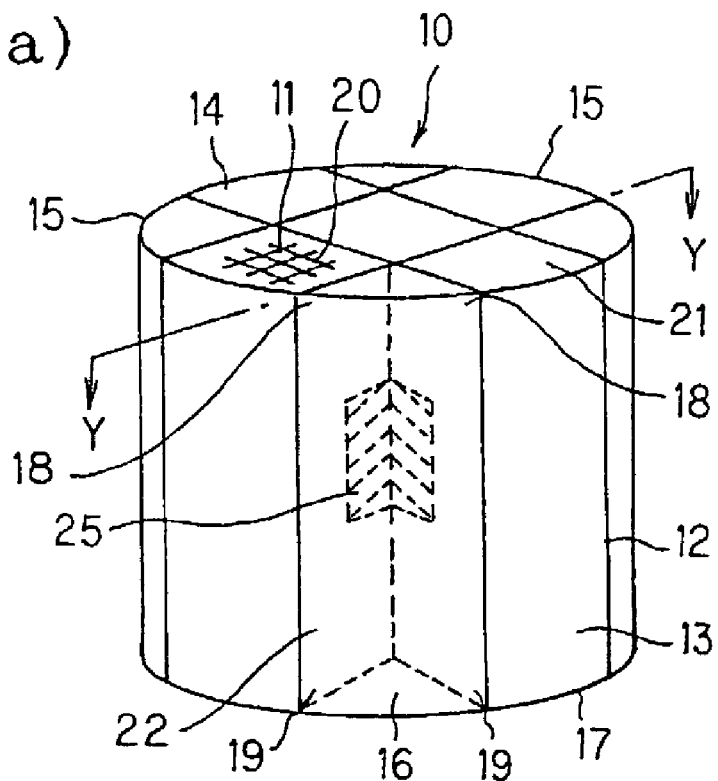
FIG. 6(a) is a perspective view showing still other embodiment of the honeycomb structure according to the present invention.
Figure 6B:
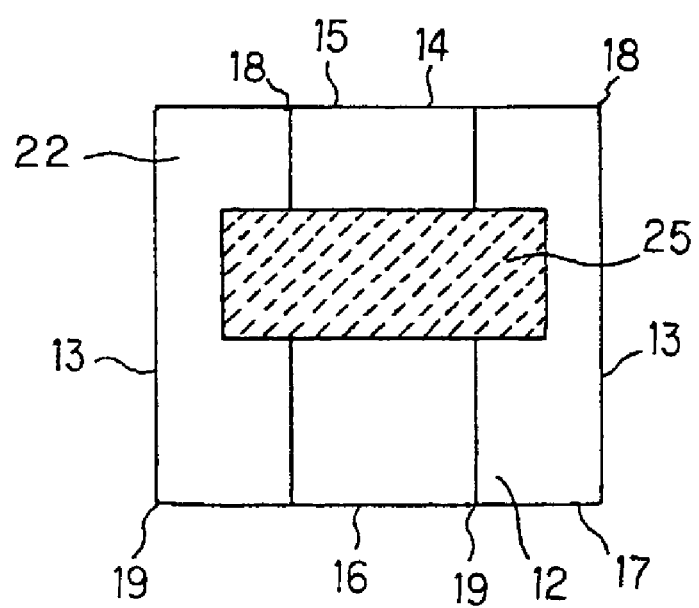
FIG. 6(b) shows a Y-Y section of FIG. 6(a).
Figure 7A:
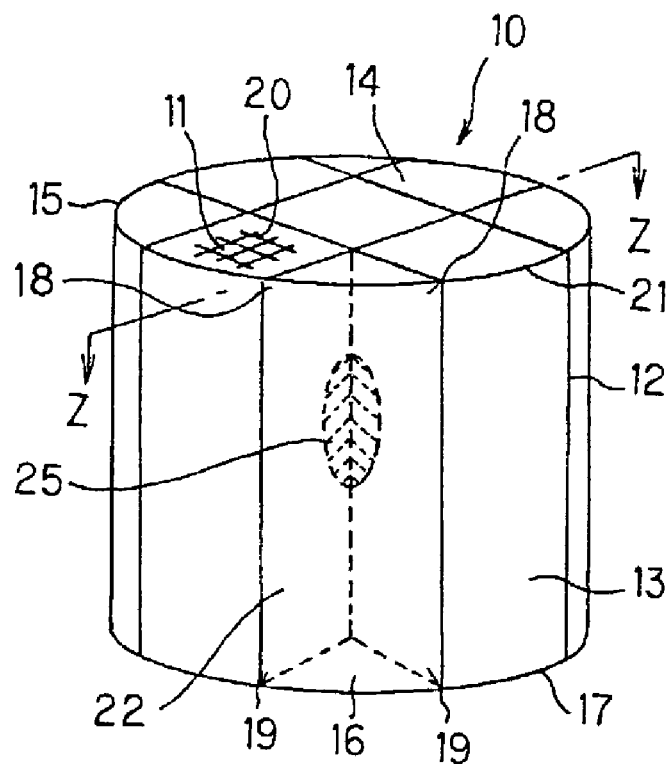
FIG. 7(a) is a perspective view showing still other embodiment of the honeycomb structure according to the present invention.
Figure 7B:
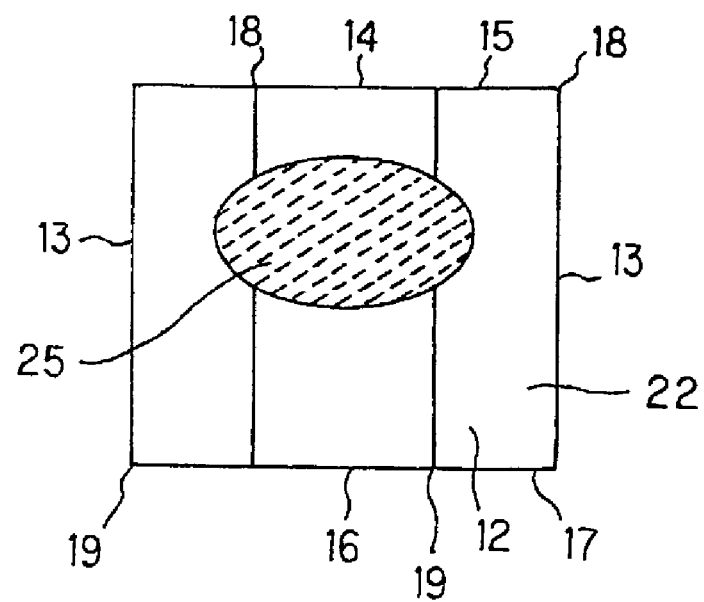
FIG. 7(b) shows a Z-Z section of FIG. 7(a).

In the honeycomb structures 10 shown in FIGS. 6(a) and 6(b), as in FIG. 4(a), the bonding member 25 has a rectangular section; in the honeycomb structures 10 shown in FIGS. 7(a) and 7(b), the bonding material 25 has an elliptical section.

In these honeycomb structures 10, the same effect as mentioned for the honeycomb structures 10 shown in FIGS. 4(a) to 4(d) is obtained; moreover, since a large number of unbonded areas 12 can be formed uniformly in each honeycomb structure 10, the thermal stress generating in the honeycomb structure 10 can be reduced greatly.

Figure 8A:
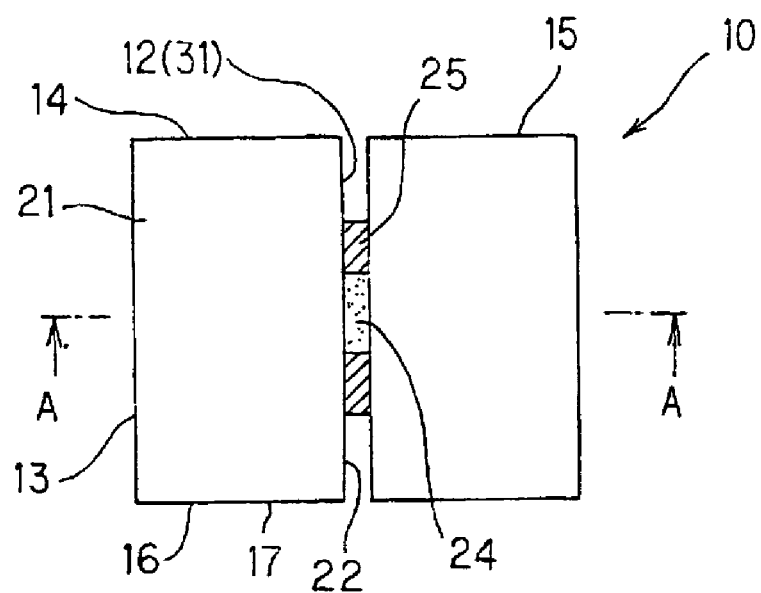
FIG. 8(a) is a perspective view showing still other embodiment of the honeycomb structure according to the present invention.
Figure 8B:
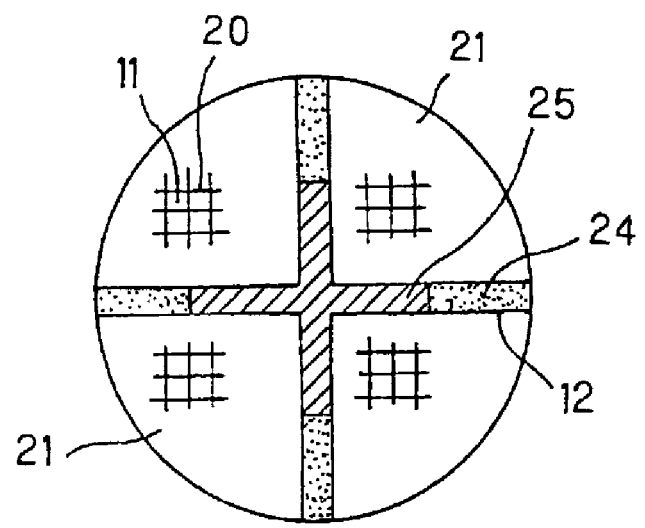
FIG. 8(b) shows a A-A section of FIG. 8(a).

In the honeycomb structure 10 shown in FIGS. 8(a) and 8(b), as in the honeycomb structures shown in FIGS. 4(a) 4(b), 4(c) and 4(d), four honeycomb segments 21 are bonded by a bonding material 25; the bonding material 25 is provided at the center of each honeycomb structure 10; each unbonded area 12 is formed so as to include all of the lengths of each bonded plane 22 opening to the side 13, gas outlet side end face 14 and gas inlet side end face 16 of the honeycomb structure 10. Further, in this honeycomb structure 10, a filler 24 is provided in a portion of each unbonded area 12 so as to surround part of the bonding material 25 and be exposed to part of the side 13; and each unfilled portion 31 (which is a gap) is formed so as to contain part of the length of each bonded plane 22 contacting with the side 13 of the honeycomb structure 10 and all of the lengths of each bonded plane 22 opening to the gas outlet side end face 14 and gas inlet side end face 16 of the honeycomb structure 10.

In this honeycomb structure 10, since there is no flowing of gas through the unbonded area 12 in the direction of the through-channels owing to the presence of the filler 24, the blowing off of gas through the unbonded area 12 can be prevented; further, since the unfilled portion 31 is formed over each total length of the bonded plane 22 opening to the gas outlet side end face 14 and gas inlet side end face 16 of the honeycomb structure 10, reduction in thermal stress is extremely large.

Figure 9A:
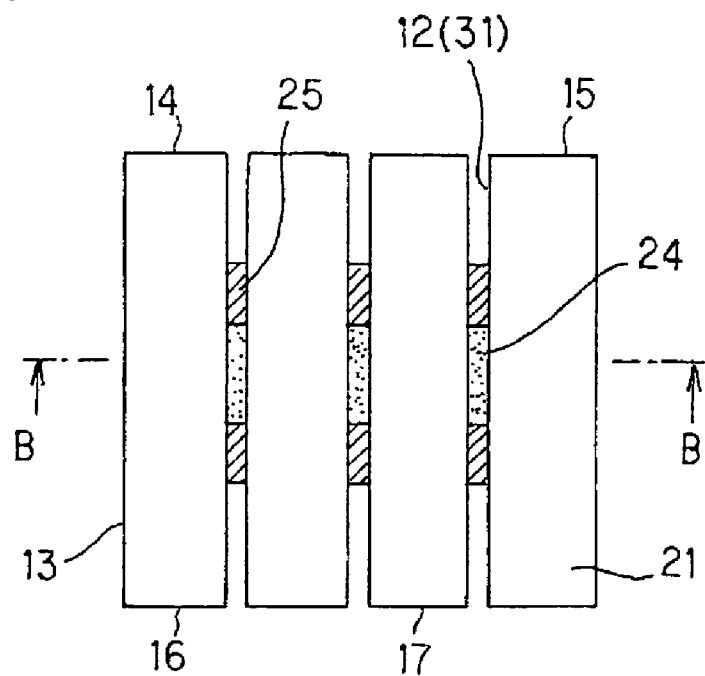
FIG. 9(a) is a perspective view showing still other embodiment of the honeycomb structure according to the present invention.
Figure 9B:
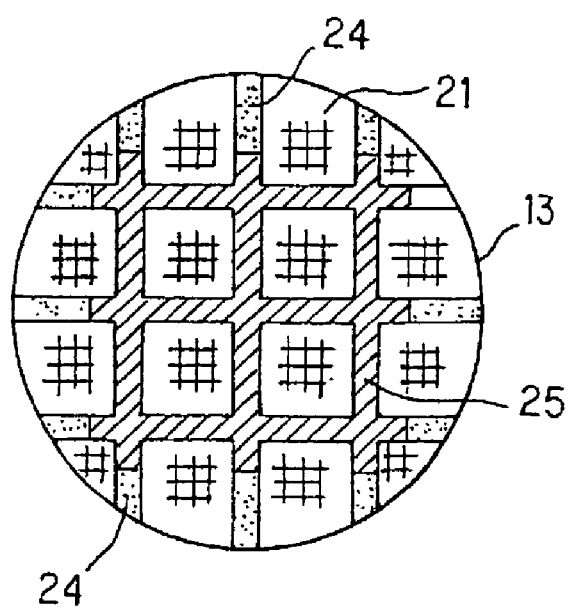
FIG. 9(b) shows a B-B section of FIG. 9(a).

The honeycomb structure 10 shown in FIGS. 9(a) and 9(b) has the same constitution as the honeycomb structure 10 shown in FIGS. 8(a) and 8(b) except that as in the honeycomb structure 10 shown in FIGS. 6(a) and 6(b), nine honeycomb segments 14 are bonded and therefore a large number of bonded planes 22 are formed.

In this honeycomb structure 10, the same effect as mentioned for the honeycomb structure 10 shown in FIGS. 8(a) and 8(b) is obtained; further, since a large number of unbonded areas 12 can be formed uniformly in the honeycomb structure 10, the thermal stress generating in the honeycomb structure 10 can be reduced to a very low level.

Figure 10A:
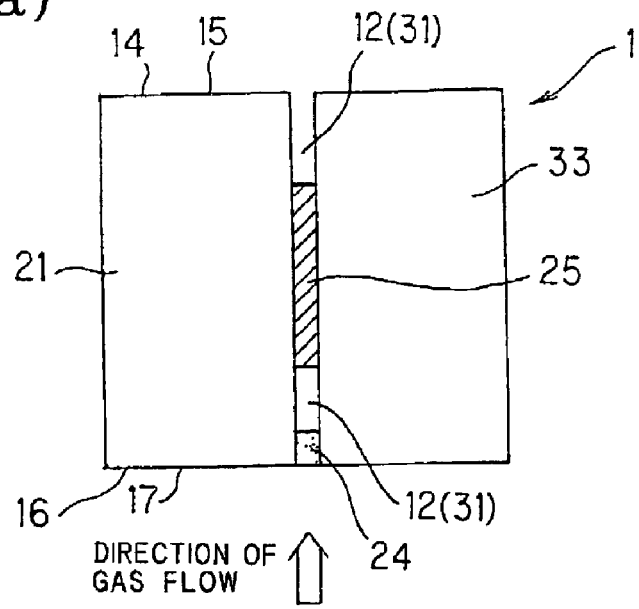
FIG. 10(a) is a side view showing an embodiment of the honeycomb filter according to the present invention.
Figure 10B:
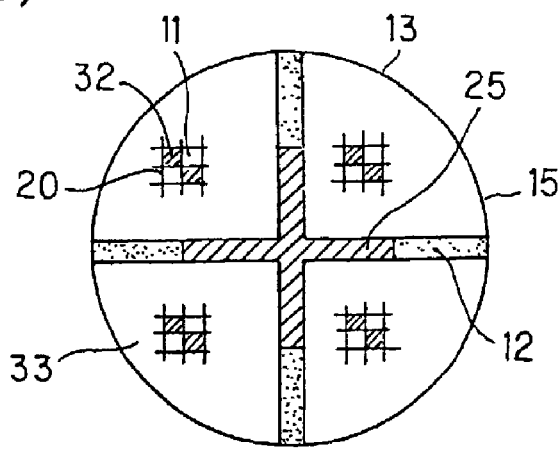
FIG. 10(b) is a plan view of the same honeycomb filter.
Figure 10C:
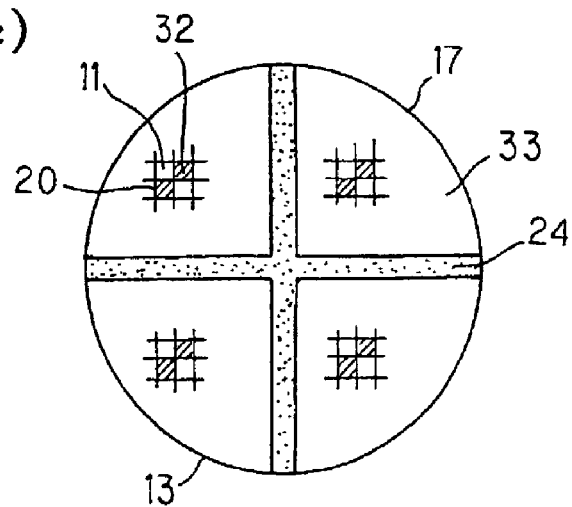
FIG. 10(c) is a bottom view of the same honeycomb filter.
Figure 11A:
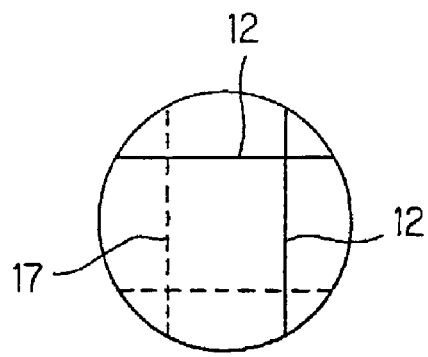
FIG. 11(a) is a plan view showing an example of slit formation in the honeycomb structure of the present invention.
Figure 11B:
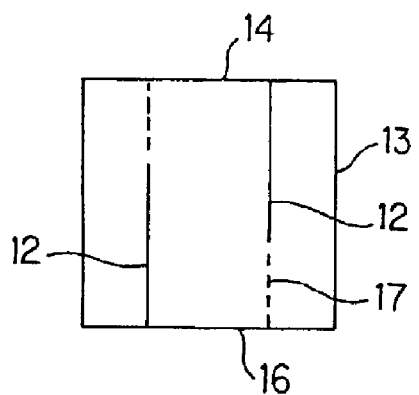
FIG. 11(b) is a front view of the same honeycomb structure.
Figure 11C:
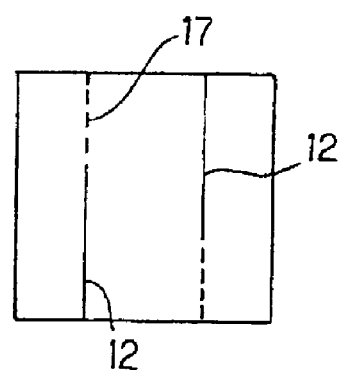
FIG. 11(c) is a side view of the same honeycomb structure.
Figure 11D:
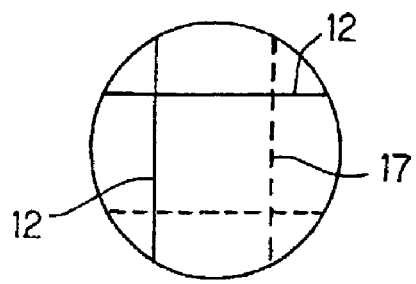
FIG. 11(d) is a bottom view of the same honeycomb structure.

FIGS. 10(a), 10(b) and 10(c) show an embodiment used as a honeycomb filter. In the honeycomb filter 1 shown in FIGS. 10(a), 10(b) and 10(c), as in the honeycomb structures 10 shown in FIGS. 4(a), 4(b), 4(c) and 4(d), four honeycomb filter segments 33 (32 representing plugged material) are bonded by a bonding material 25, the bonding material 25 is provided at the center of the honeycomb filter 1, and each unbonded area 12 is formed so as to include all of the lengths of each bonded plane 22 opening to the side 13, gas outlet side end face 14 and gas inlet side end face 16 of the honeycomb filter 1 . Further, in this honeycomb filter 1, a filler 24 is provided in a portion of each unbonded area 12 so as to block all the portion of the unbonded area 12 exposed to the gas inlet side end face 16 of the honeycomb filter 1; and an unfilled portion 31 which forms a gap without being filled with a filler is formed between the above filler 24 and the bonding material 25 and also so as to be exposed to the gas outlet side end face 14 .

This honeycomb filter 1 shows no accumulation of the soot present in exhaust gas, at the unfilled portion 31 of the gas inlet side of the filter 1 and can be suitably used as a honeycomb filter. Further, having no gap at the end face 14 of the gas outlet side or in the vicinity of the end face 16 of the gas inlet side, the honeycomb filter 1 shows a very large reduction in thermal stress.

Next, description is made on examples of the process for producing a honeycomb structure or a honeycomb filter according to the present invention. However, the present invention is not restricted to these examples.

Production Example 1

There was used, as raw materials, a mixed powder consisting of 75% by weight of a SiC powder and 25% by weight of a metal Si powder. Thereto were added methyl cellulose, hydroxypropyl methyl cellulose, a surfactant and water to produce a plastic kneaded material.

Then, this kneaded material was subjected to extrusion molding to obtain a cylindrical body. The cylindrical body was cut into nine parts in the axial direction at given intervals to obtain a plurality of honeycomb bodies of 0.3 mm in partition wall thickness and 31 cells/cm$^2$ in cell density, each having a different shape (e.g. fan or square) in a section perpendicular to the axial direction.

Next, these plural honeycomb bodies were dried using a microwave and hot air, after which a bonding layer having the same composition as that of the above-mentioned kneaded material was formed on each honeycomb body at about the center of each plane of the honeycomb body parallel to the direction of the through-channels of the honeycomb body. The resulting honeycomb bodies were unified into one piece by bonding them via the bonding layer, followed by drying. The resulting unified material was subjected to debinding at about 400° C. in an N$_2$ atmosphere and then fired at about 1,550° C. in an inert gas atmosphere (e.g. Ar). Then, a filler containing, for example, an aluminosilicate fiber, a SiC powder, a metal Si powder, an organic binder. an inorganic binder and water was filled at a width of 5 to 10 mm at part of the bonding layer-free area of each bonding layer-formed plane, followed by drying at about 100° C., whereby could be produced a honeycomb structure shown in FIG. 9, having a dimension of 144 mm (diameter) and 152 mm (length) and a gap (bonded area) of 2 mm.

Production Example 2

A honeycomb structure shown in FIG. 9 could be produced in the same manner as in Production Example 1 except that in Production Example 1, a plurality of rectangular parallelepiped honeycomb bodies of 50 mm×50 mm (end face) were produced, unified into one piece, and fired to obtain a honeycomb structure, this honeycomb structure was subjected to machining of outer surface to obtain a cylinder of 144 mm (diameter) and 152 mm (length), a kneaded material (which was the same as the bonding layer formed previously) was coated on the side of the cylinder, and the kneaded material-coated cylinder was fired.

Production Example 3

A honeycomb structure shown in FIG. 9 could be produced in the same manner as in Production Example 1 except that in Production Example 1, a plurality of prismatic honeycomb bodies of 50 mm×50 mm (end face) were produced, bonded into one piece, and fired to obtain a honeycomb structure, this honeycomb structure was subjected to machining of outer surface to obtain a cylinder of 144 mm (diameter) and 152 mm (length), a filler was coated on the side of the cylinder, and the filler-coated cylinder was dried.

Production Example 4

Honeycomb filters could be produced in the same manners as in Production Examples 1 to 3 except for the step of plugging alternately an every other end face of the inlet side and outlet side of the through-channels of the honeycomb segment.

EXAMPLES

The present invention is described more specifically below by way of illustrative Examples. However, the present invention is not restricted to these Examples.

Example 1

A SiC-made honeycomb body having a dimension of 144 mm (diameter)×152 mm (length), a partition wall thickness of 0.3 mm and a cell density of 31 cells/cm$^2$ was produced according to Production Example 1; a plural number of through-channels of the honeycomb structure passing through the end face of the inlet side and the end face of the outlet side was alternately plugged every other end of the inlet side and outlet side of the honeycomb structure, whereby was produced a particulate honeycomb filter for purification of diesel engine exhaust gas. In this honeycomb filter, as shown in FIG. 1(a), each unbonded area 12 was formed in a triangular shape so that the unbonded area 12 included each part of the lengths of each bonded plane 22 opening to the gas outlet side end face (upper end face) 14 and side 13 of the honeycomb structure 10 and that the width of the unbonded area 12 in a direction Y from the side 13 of the honeycomb structure 10 toward its center became gradually smaller toward the gas inlet side end face 16 of the honeycomb structure 10; and the lengths of each unbonded area 12 were 30 mm from the periphery 15 of the gas outlet side end face (upper end face) of the honeycomb structure 10 toward the direction of the channels of the through-channels and 50 mm from the periphery 15 of the gas outlet side end face (upper end face) of the honeycomb structure 10 toward its center.

Examples 2 to 6 and 10

Honeycomb filters were produced in the same manner as in Example 1 except that they had structures having unbonded areas shown in FIG. 1(d), FIG. 3(a), FIG. 3(b), FIG. 4(a), FIG. 4(b) and FIG. 7 and that when each unbonded area 12 (gap) of honeycomb structure 10 was formed so as to be exposed to the gas inlet side end face (lower end face) 16, each exposed portion was filled with a filler 25 having the properties shown in Table 1, at a depth of 6 mm.

Incidentally, in Table 1, "Young's modulus ratio" refers to a ratio of Young's modulus of filler to Young s modulus of honeycomb segment. Each Young's modulus was measured and calculated from the relation between load and displacement, according to a test method for isothermal elastic modulus. Also in Table 1, "strength" refers to a strength of filler to that of honeycomb segment. Each strength was measured using a material tester according to a four-point bending strength test (JIS 1601). A case when the filler had a larger strength, was reported as "large"; and a case when the filler had a smaller strength, was reported as "small".

Examples 7 to 9

There were produced honeycomb filters same as that of Example 6 except that the fillers used had Young s moduli and strengths as shown in Table 1.

Example 11

There was produced a honeycomb filter same as that of Example 1 except that each unbonded area 12 was formed so as to have a length of 15 mm from the periphery 15 of the gas outlet side end face (upper end face) of the honeycomb structure 10 toward its center and a length of 5 m from the periphery 15 of the gas outlet side end face (upper end face) of the honeycomb structure 10 toward the direction of the through-channels of the honeycomb structure 10.

Examples 12 and 13

There were produced honeycomb filters same as that of Example 1 except that the structure shown in FIG. 3(a) was employed and that each unbonded area 12 was formed so as to have a length of 15 mm or 5 mm from the periphery 15 of the gas outlet side end face (upper end face) of the honeycomb structure 10 toward the direction of the through-channels of the honeycomb structure 10 and a length of 15 mm or 5 mm from the periphery 15 of the gas outlet side end face (upper end face) of the honeycomb structure 10 toward its center.

Comparative Example 1

There was produced a honeycomb filter same as that of Example 1 except that no unbonded area was formed.

EVALUATION

A ceramic nonintumescent mat as a holding material was wound round the side 13 of a honeycomb structure (a honeycomb filter) 10 and forced into a canning case to obtain a canning structure. Then, a soot-containing combustion gas generated by burning a gas oil (a diesel fuel) was allowed to enter the honeycomb structure (honeycomb filter) 10 from its lower end face 16 and leave from its upper end face 14, to load soot in the honeycomb structure (honeycomb filter) 10. The honeycomb structure (honeycomb filter) 10 was allowed to cool to room temperature. Then, a combustion gas containing a given proportion of oxygen was allowed to enter the honeycomb structure (honeycomb filter) 10 from its lower end face 16, to burn and remove the soot. Thus, a filter regeneration test was conducted.

In the honeycomb filters of Examples 1 to 10 and Comparative Example 1, the transition period in which inlet gas temperature was increased from room temperature to 800° C., and the amount of soot loaded were each set at three levels as follows.

Transition period:
Standard=300 seconds
Short=240 seconds
Shortest=180 seconds

Amount of soot captured:
Standard=10 g/liter
Large=14 g/liter
Largest=18 g/liter Then, the above-mentioned filter regeneration test was carried out and generation of cracks was examined at the upper end face (outlet), lower end face (inlet), side and inside of the honeycomb structure.

Meanwhile, in the honeycomb filters of Examples 1 and 11 to 13, the amount of soot loaded was set at six levels ranging from 10 g/liter to 20 g/liter (the transition period was standard), and the above-mentioned filter regeneration test was conducted.

The results are shown in Table 1 and Table 2.

Incidentally, as to the generation of cracks, no generation was reported as o and generation in any amount (much or little) was reported as Δ.

became bigger, and cracks appeared partly when the unbonded area was formed only in the vicinity of one end face of honeycomb filter as in FIG. 1(*a*) and FIG. 3(*a*). However, substantially no crack appeared in the filter of FIG. 4(*b*) having each unbonded area so as to contain all of the lengths of each bonded plane contacting with the side, gas outlet side end face and gas inlet side end face of honeycomb filter; and no crack appeared in the filter of FIG. 7 having an increased number of bonded planes. Generation of cracks was low when the Young's modulus of filler was 80% or less of the Young's modulus of the honeycomb segment or the strength of filler was smaller than the strength of honeycomb segment.

As also appreciated from Table 2, when the lengths of the unbonded area from the periphery 15 of upper end face of honeycomb structure 10 toward its through-channel direction and from the periphery 15 of upper end face of

TABLE 1

| | | | | Amount of soot captured | | | | | | | | | | | |
|---|---|---|---|---|---|---|---|---|---|---|---|---|---|---|---|
| | | | | Largest | | | | Large | | | | Standard | | | |
| | | | | | | | | Transition period | | | | | | | |
| | | Filler | | Shortest | | | | Short | | | | Standard | | | |
| | | Young's | | Sites of cracks examined | | | | | | | | | | | |
| | Structure | modulus ratio | Strength | In-let | Out-let | In-side | Side | In-let | Out-let | In-side | Side | In-let | Out-let | In-side | Side |
| Ex. 1 | FIG. 1 (a) | 80% | Small | Δ | Δ | Δ | Δ | Δ | ○ | ○ | Δ | ○ | ○ | ○ | ○ |
| Ex. 2 | FIG. 1 (d) | 80% | Small | Δ | Δ | Δ | Δ | ○ | ○ | ○ | ○ | ○ | ○ | ○ | ○ |
| Ex. 3 | FIG. 3 (a) | 80% | Small | Δ | ○ | Δ | Δ | Δ | ○ | Δ | Δ | ○ | ○ | ○ | ○ |
| Ex. 4 | FIG. 3 (b) | 80% | Small | ○ | ○ | Δ | Δ | ○ | ○ | Δ | Δ | ○ | ○ | ○ | ○ |
| Ex. 5 | FIG. 4 (a) | 80% | Small | ○ | ○ | Δ | Δ | ○ | ○ | ○ | ○ | ○ | ○ | ○ | ○ |
| Ex. 6 | FIG. 4 (b) | 80% | Small | ○ | ○ | ○ | Δ | ○ | ○ | ○ | ○ | ○ | ○ | ○ | ○ |
| Ex. 7 | FIG. 4 (b) | 83% | Small | ○ | ○ | Δ | Δ | ○ | ○ | ○ | Δ | ○ | ○ | ○ | ○ |
| Ex. 8 | FIG. 4 (b) | 80% | Large | ○ | ○ | Δ | Δ | ○ | ○ | Δ | Δ | ○ | ○ | ○ | ○ |
| Ex. 9 | FIG. 4 (b) | 85% | Large | ○ | Δ | Δ | Δ | ○ | ○ | Δ | Δ | ○ | ○ | ○ | ○ |
| Ex. 10 | FIG. 7 | 80% | Small | ○ | ○ | ○ | ○ | ○ | ○ | ○ | ○ | ○ | ○ | ○ | ○ |
| Comp. Ex. 1 | No unbonded area | 80% | Small | Δ | Δ | Δ | Δ | Δ | Δ | Δ | Δ | Δ | Δ | ○ | ○ |

TABLE 2

| | Structure | Example 1 FIG. 1 (a) | Example 11 FIG. 1 (a) | Example 12 FIG. 3 (a) | Example 13 FIG. 3 (a) |
|---|---|---|---|---|---|
| Unbonded area | Length toward center | 50 mm | 15 mm | 15 mm | 5 mm |
| | Length in through-channel direction | 30 mm | 5 mm | 15 mm | 5 mm |
| Honeycomb structure | Diameter | 144 mm | 144 mm | 144 mm | 144 mm |
| | Total length | 152 mm | 152 mm | 152 mm | 152 mm |
| Amount of Soot loaded (g/l) | 10 | ○ | ○ | ○ | ○ |
| | 12 | ○ | ○ | ○ | Δ |
| | 14 | ○ | Δ | ○ | Δ |
| | 16 | ○ | Δ | ○ | Δ |
| | 18 | ○ | Δ | ○ | Δ |
| | 20 | ○ | Δ | Δ | Δ |

As appreciated from Table 1, in the honeycomb structure of Comparative Example 1 having no unbonded area, cracks appeared in the inlet side end face and the outlet side end face even under the standard conditions; in contrast, no crack appeared under the same standard conditions in the honeycomb filters of Examples 1 to 10 [FIG. 1(*a*), FIG. 1(*d*), FIG. 3(*a*), FIG. 3(*b*), FIG. 4(*a*), FIG. 4(*b*) and FIG. 7].

As the transition period was shortened and the amount of soot loaded was increased, temperature nonuniformity honeycomb structure 10 toward its center become smaller than given levels, there was a tendency that the degree of crack generation increased with the increase in the amount of soot.

INDUSTRIAL APPLICABILITY

As described above, in the honeycomb structure and honeycomb filter of the present invention, the individual portions are not restricted by each other and can make free deformation even when there appears temperature non-uniformity therein; therefore, thermal stress can be reduced and generation of cracks can be prevented.

The invention claimed is:

1. A honeycomb structure comprising a plurality of honeycomb segments each having:
   a number of through-channels separated from each other by partition walls, said through-channels terminating in a portion of a honeycomb structure end face and bounded by two planes and a side surface;
   wherein said honeycomb structure is formed as a unified body by bonding a plane of each said plurality of honeycomb segments to a plane of another honeycomb segment substantially parallel to a direction of said through-channels with a bonding material comprising components that are substantially the same as the components constituting the honeycomb segments;
   wherein each plane of each honeycomb segment includes an unbonded area immediately adjacent a periphery of the honeycomb structure end face and comprising an edge portion opening to said periphery of the honeycomb structure end face; and
   wherein at least a part of the unbonded area of each plane includes a filler material which is different and distinct from the bonding material and comprising a heat-resistant inorganic material.

2. A honeycomb structure according to claim 1, wherein the bonding material is provided continuously on each plane.

3. A honeycomb structure according to claim 1, wherein the unbonded area of each plane is formed from the periphery of a gas inlet side end face or the periphery of a gas outlet side end face toward a direction of the through-channels, in a length of 10% or more relative to a total length of the honeycomb structure in said direction.

4. A honeycomb structure according to claim 1,
   wherein the unbonded area of each plane is formed from the periphery of a gas inlet side end face or the periphery of a gas outlet side end face toward a direction of a center of the end face, in a length of 10% or more relative to a total width of the end face of the honeycomb structure in said direction.

5. A honeycomb structure according to claim 1,
   wherein the filler satisfies at least either one of the requirements that its Young's modulus is 80% or less of the Young's modulus of honeycomb segments, and that its material strength is smaller than a material strength of said honeycomb segments.

6. A honeycomb structure according to claim 1,
   wherein the honeycomb segments comprise mainly at least one kind of ceramics selected from the group consisting of cordierite, mullite, alumina, spinel, silicon carbide, silicon nitride, lithium aluminum silicate, aluminum titanate and combinations thereof, or of a Fe—Cr—Al type metal.

7. A honeycomb structure according to claim 1,
   further comprising a catalyst loaded on partition walls of the honeycomb segments.

8. A honeycomb structure according to claim 1,
   wherein said through-channels are alternately plugged at every other end face of the gas inlet side and gas outlet side, respectively, of the honeycomb structure.

* * * * *